United States Patent [19]
Chandler et al.

[11] Patent Number: 6,077,364
[45] Date of Patent: *Jun. 20, 2000

[54] COPPER TROLLEY WIRE AND A METHOD OF MANUFACTURING COPPER TROLLEY WIRE

[75] Inventors: Thomas J. Chandler, Fairfield, Conn.; John Corrado, Bayonne, N.J.

[73] Assignee: Phelps Dodge Industries, Inc., Phoenix, Ariz.

[*] Notice: This patent issued on a continued prosecution application filed under 37 CFR 1.53(d), and is subject to the twenty year patent term provisions of 35 U.S.C. 154(a)(2).

[21] Appl. No.: 08/884,985

[22] Filed: Jun. 30, 1997

[51] Int. Cl.$^7$ .................................................. C22C 9/00
[52] U.S. Cl. .................................................. 148/432
[58] Field of Search .................................................. 148/432

[56] References Cited

U.S. PATENT DOCUMENTS

| | | | |
|---|---|---|---|
| 2,079,239 | 5/1937 | Bartel | 148/11.5 |
| 2,504,935 | 4/1950 | Morris | 75/153 |
| 3,829,630 | 8/1974 | Belyaev | 191/41 |
| 4,047,980 | 9/1977 | Watson et al. | 148/12.7 C |
| 4,067,750 | 1/1978 | Mravic et al. | 148/2 |
| 5,087,300 | 2/1992 | Takayama et al. | 427/360 |
| 5,391,243 | 2/1995 | Goto et al. | 148/554 |
| 5,534,087 | 7/1996 | Hirota et al. | 148/554 |

FOREIGN PATENT DOCUMENTS

| | | |
|---|---|---|
| 43 21 921 | 1/1995 | Germany . |
| 195 39 174 | 2/1997 | Germany . |
| 54-79121 | 6/1979 | Japan . |
| 3-56633 | 3/1991 | Japan . |
| 7021843 | 1/1995 | Japan . |
| 7086325 | 3/1995 | Japan . |
| 7090430 | 4/1995 | Japan . |
| 9700339 | 1/1997 | WIPO . |

OTHER PUBLICATIONS

Betzalel Avitzur, *Handbook of Metal–Forming Processes*, John Wiley & Sons, New York, 1983, pp. 35–248.

*Metals Handbook, Desk Edition*, Howard E. Boyer and Timothy L. Gall, eds., American Society for Metals, Metals Park, Ohio, 1985, pp. 7–24 through 7–26.

"Standard Specification for Copper Trolley Wire—Designation: B47–95a", ASTM Committee on Standards, American Society for Testing and Materials, West Consohocken, PA, 1995.

"How Tough Do You Need It?", Copper Rod Bulletin, Southwire Company, Carrollton, GA, 1996.

*Primary Examiner*—Sikyin Ip
*Attorney, Agent, or Firm*—Fish & Neave; Jeffery H. Ingerman

[57] ABSTRACT

Copper trolley wire consisting essentially of at least 99.90% copper and at most 0.10% of a metal selected from the group consisting of silver, cadmium, tellurium, titanium, magnesium, manganese, chromium, zirconium, tin and combinations thereof, has a minimum tensile strength well exceeding that listed in ASTM Standard B47-95a for copper trolley wire. The copper trolley wire has a uniform fine grain size. The copper trolley wire is manufactured using a process of casting a copper rod of the appropriate composition, hot working or "conforming" the cast rod to reduce its diameter, and then cold working it to form the desired wire by drawing it through one or more dies. Preferably, no annealing step is used.

9 Claims, 4 Drawing Sheets

PHOTOMICROGRAPH (100 X MAGNIFICATION)

COPPER TROLLEY WIRE AND A METHOD OF MANUFACTURING COPPER TROLLEY WIRE

FIELD OF THE INVENTION

This invention relates to the field of copper trolley wire, also known as the contact wire in overhead catenary rail systems. The invention relates to a copper trolley wire having improved mechanical properties and to a method of manufacturing the copper trolley wire with improved mechanical properties.

BACKGROUND OF THE INVENTION

Copper trolley wire has been in commercial use for a long time. There is a standard set forth by the American Society for Testing and Materials (ASTM), as ASTM B47-95a, which is titled the Standard Specification for Copper Trolley Wire. It is well known and straight forward for those of skill in this art to make copper trolley wire in accord with this ASTM standard.

This ASTM standard lists the minimum acceptable mechanical properties for copper trolley wire at various wire sizes. For example, grooved wire of a copper and silver alloy having a nominal area of 300,000 circular mils(cmils) is required by the ASTM standard to have a minimum tensile strength of 48,000 pounds per square inch (psi).

Typical methods for manufacturing copper trolley wire that meets the ASTM standard include methods such as continuous casting, rolling, and/or drawing (e.g., area reduction) and combinations thereof. Such methods are disclosed, for example, in Avitzur, *Handbook of Metal Forming Processes* (John Wiley & Sons 1983). These known methods are sometimes referred to as cold working and in some instances utilize an annealing step. Another known method for producing copper trolley wire meeting the minimum ASTM standards is to begin with a large wire bar, and drawing and/or rolling the wire bar to the desired dimension.

However, copper trolley wire manufactured in the typical way is limiting to the design of rail systems using such wire. For example, in a rail system using copper trolley wire, substations for electrical power must be placed at certain distances apart from each other. If it is desired to reduce the number of substations, copper trolley wire made to comply with the ASTM standard is inadequate because it lacks the desired tensile strength. Also for example, the advent of high speed rail and the desire to reduce costs have exposed practical limitations in copper trolley wire that has the mechanical properties listed in the ASTM standard.

Therefore, it has become desirable to have a copper trolley wire that has improved mechanical properties. It is also desirable to obtain such improved mechanical properties in copper trolley wire using a commercially acceptable manufacturing process, namely a process that is not cost prohibitive. Specifically, the need is to develop a trolley wire that can provide rail design options not currently available and that can withstand the rigors of high speed rail transit, while still providing sufficient transfer of electricity.

Therefore, it is an object of this invention to provide a copper trolley wire with improved mechanical properties. More specifically, it is an object of this invention to provide a copper trolley wire with tensile strength well exceeding the minimum listed in the ASTM standard.

It is also an object of this invention to provide a method of making copper trolley wire with improved mechanical properties. Further, it is an object of this invention to provide a method of making copper trolley wire in a commercially feasible manner.

SUMMARY OF THE INVENTION

These objects are met by the invention described herein by providing a high conductivity copper or copper alloy trolley wire used as an electrical contact with improved tensile strength. The increased tensile strength significantly exceeds industry standards and the ASTM standard allowing improved design and lower cost with regard to tensile loading on the wire. Typically, the copper trolley wire of this invention has a tensile strength of at least 10% greater than that listed in ASTM B47-95a. The copper content of this new trolley wire is about 99.90% (with this percentage optionally including small amounts of silver) and can be alloyed with various known alloying ingredients, such as silver, cadmium, magnesium, manganese, tellurium, chromium, zirconium titanium or tin. Preferably, the new copper trolley wire has a relatively fine grain size, generally not exceeding about 0.040 mm, which can be achieved through the manufacturing method disclosed herein. The copper trolley wire of this invention also has improved properties, as compared to the copper trolley wire in ASTM B47-95a, in the areas of ductility, yield point, hardness, and creep, while maintaining high conductivity. The new copper trolley wire of this invention has the same or better conductivity (also known as resistivity) as in ASTM B47-95a.

Also, this invention includes a cost effective method of manufacturing the improved copper trolley wire. Generally, the new method of making copper trolley wire utilizes a hot working step in addition to the known methods of cold working. Known methods also use an annealing step to recrystallize the copper trolley wire. However, the new method of this invention works the copper trolley wire while generating heat, and thus a heating (or annealing) step is not necessary to the method. Without being bound by any theory, it is believed that the new method which uses hot working, also referred to herein as conforming or extrolling, advantageously reduces the grain size of the copper trolley wire prior to the cold working steps. This is not to say that annealing cannot be used in conjunction with this invention. However, the method of this invention preferably excludes annealing as a separate step in the process of making the new copper trolley wire disclosed herein.

More specifically, this invention provides a method for making copper trolley wire comprising the steps of continuously casting a copper rod of about 99.90% copper, conforming the copper rod to arrive at a coil of wire, cold working the coil of wire to the desired dimension, optionally annealing the cold worked wire at known industry temperatures and cold working the wire again to a final desired dimension.

DETAILED DESCRIPTION OF THE PREFERRED EMBODIMENTS

The new copper trolley wire of this invention is a wire that generally complies with the dimensions set forth in ASTM B47-95a. More preferably, the trolley wire is grooved copper trolley wire. The dimensions of the new wire can vary in accord with the ASTM standard.

The copper trolley wire is comprised mostly of copper. The copper content is about 99.90% by weight. The copper may be alloyed with known alloying agents, including silver, cadmium, tellurium, titanium, magnesium, manganese, chromium, zirconium or tin. The total amount of alloying agents should not exceed 0.10% by weight. The alloying agents should be employed in a manner that does not adversely affect the conductivity of the wire.

The copper trolley wire of the invention has a tensile strength much improved over that of the ASTM standard. This new copper trolley wire has a tensile strength of at least 10% greater than that required for silver bearing copper trolley wire listed in ASTM B47-95a, Tables 1 and 2. Preferably, the tensile strength is at least 12% greater than that required for silver bearing copper trolley wire listed in ASTM B47-95a. More preferably, the tensile strength is at least 15% greater, and most preferably at least 16% greater than the tensile strength for silver bearing copper trolley wire listed in ASTM B47-95a, Tables 1 and 2. For example, a copper trolley wire of this invention having an area of 300,000 cmils has a tensile strength of at least 54,000 psi, which is about 12.5% above the standard specification. In practice, a 300,000 cmil wire of this invention has a tensile strength of about 56,000 psi, which about 16.6% greater than the standard specification. The tensile strength is measured by methods known to those skilled in the art, specifically, ASTM E8-96.

Other properties of the copper trolley wire of this invention that are improved over the wire in ASTM B47-95a include ductility (or elongation), yield strength, hardness and creep. Ductility is measured in accordance with ASTM E8-96. Yield strength is measured in accordance with ASTM E8-96. Hardness is measured in accordance with ASTM E18-94. Creep is measured in accordance with ASTM E139-95. The electrical conductivity is measured in accord with ASTM B193-95. In particular, the electrical conductivity of the copper trolley wire of this invention is at least that of the wire specified in ASTM B47-95a, which may be referred to as resistivity.

Figure 1:
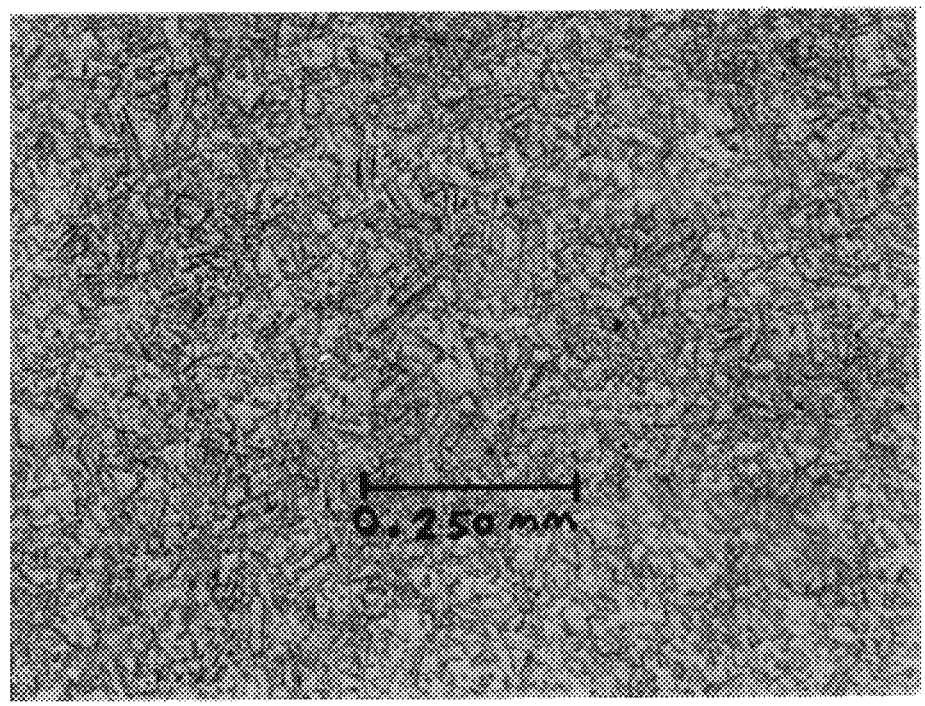
FIG. 1 is a photomicrograph of the transverse cross-section of the new copper trolley wire, showing the fine grain size, at 100 x.

The grain size of the copper trolley wire of this invention is measured in accord with ASTM E112-95. The grain size is measured after the conforming step and is relatively fine and uniform throughout the microstructure. The grain size should not exceed an average diameter of 0.040 millimeters (mm). Preferably, the grain size should not exceed an average diameter of 0.035 mm, and most preferably, 0.025 mm. FIG. 1 is a photomicrograph of the new copper trolley taken at 100 X magnification wire showing an average grain size diameter of about 0.025 mm.

Figure 2:
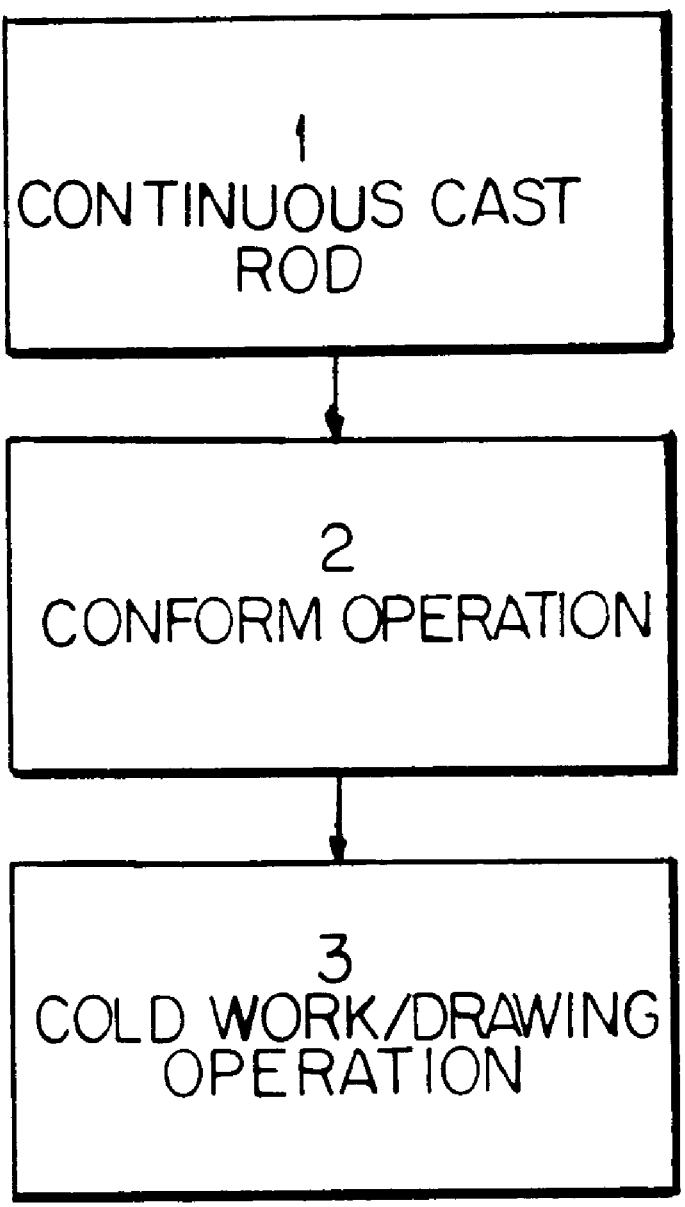
FIG. 2 is a process flow diagram of the new process to manufacture the copper trolley wire of this invention having improved mechanical properties.

The copper trolley wire of this invention is manufactured generally by continuous casting a copper rod, conforming the copper rod into a wire, and cold working the wire to obtain a final product. This general process is depicted in FIG. 2. More preferably, the process is comprised of casting a copper alloy including 99.90% by weight copper with additions of silver at a minimum of 8 oz per short ton to a maximum of 50 oz per short ton; then continuously or semi-continuously casting the copper alloy into a wire form; the copper alloy cast wire is then conformed, e.g., copper alloy cast wire is hot worked via continuous or semi-continuous extrusion to obtain the desired grain size; and the hot worked alloy is subsequently cold worked to a desired final dimension.

The method of manufacturing is shown generally in FIG. 2. As shown in FIG. 2, the first step 1 is preferably to continually cast copper into a round rod. The second step 2 is to conform the round copper rod, which reduces the size of the rod. The last step 3 is to cold work the copper rod by drawing it through dies at about room temperature to achieve the final desired rod size. A minimum of 65% cold work is performed following the conforming or extrolling step to achieve the improved tensile strength.

This method of manufacturing results in a reduced cross sectional area when comparing the area of the final wire to the area of the wire after the conforming step. The wire of this invention has a cross sectional area of reduced by about 65% from the wire area after conforming. Preferably, the cross sectional area is reduced by at least 65%, and more preferably by at least 75%.

The steps of continuous casting, cold working and annealing are well known in the industry to those of skill in this art. Avitzur, *Handbook of Metal Processes* (John Wiley & Sons 1983) describes cold working and annealing in chapters 3–5, and is incorporated herein by reference for its teachings. Continuous casting is also well known in the industry to those of skill in the art, a discussion of which is included in Avitzur.

Figure 3:
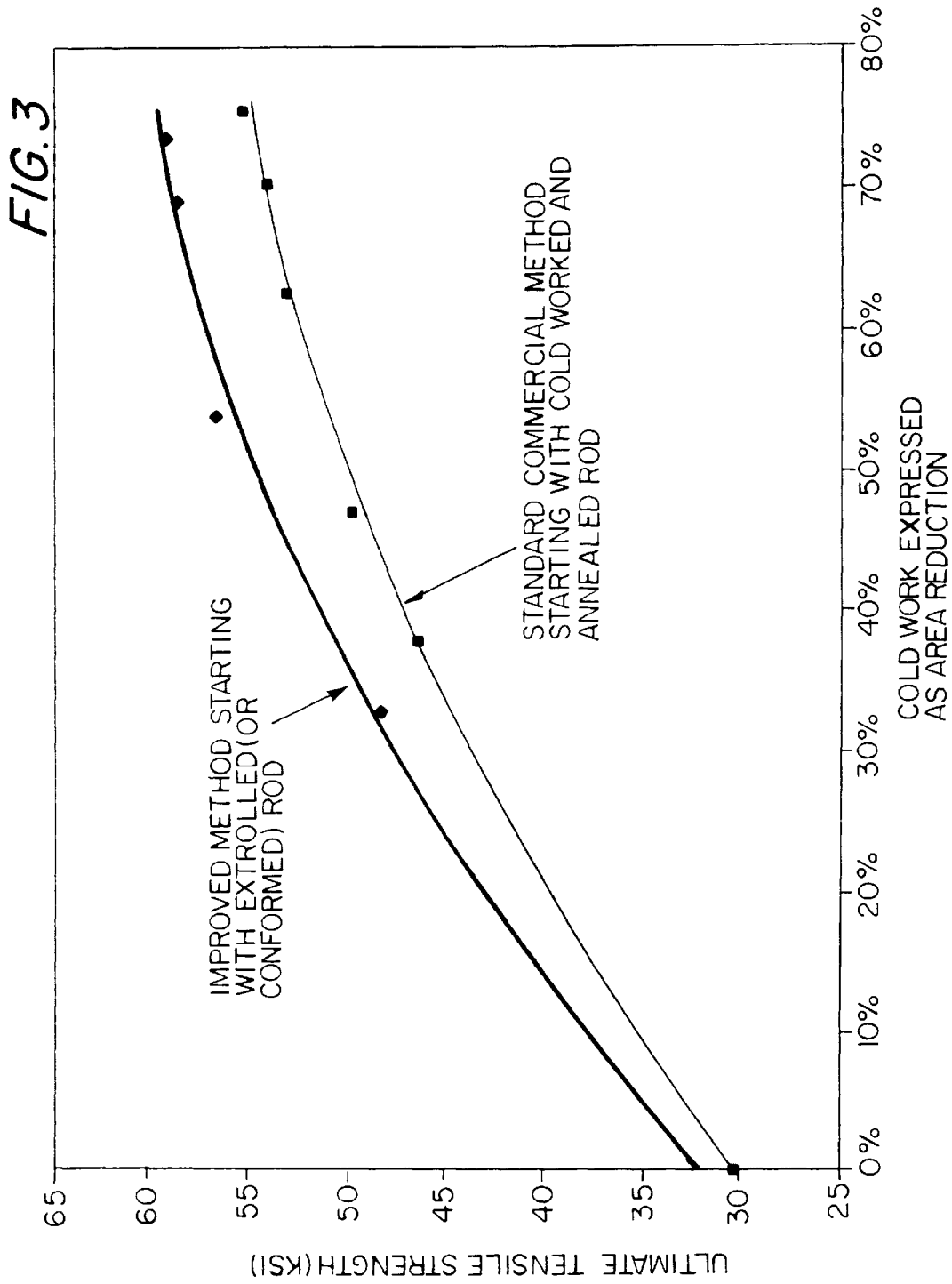
FIG. 3 is a graph comparing the tensile strength of the copper trolley wire of this invention as compared to copper trolley wire made by standard commercial methods.

Conforming, also known as extrolling, is generally known, but not in the field of copper trolley wire. For a description, see Avitzur, pp. 221–227, which is incorporated herein by reference. More preferably, conforming is employed in the inventive process without an annealing step. The benefits of applying conforming to copper trolley wire is shown in FIG. 3. FIG. 3 is a comparison of copper trolley wire prepared by known industry methods to the inventive copper trolley wire made with the conforming step and without an annealing step. FIG. 3 shows that higher tensile strengths can be achieved with this inventive method, as compared to the industry standard.

The following is a description of test results for the properties of copper trolley wires made according specific examples of the present invention, along with the properties of copper trolley wires from ASTM B47-95a. The copper trolley wire of the present invention were manufactured in the following manner, as depicted in FIG. 2. For these examples, copper was continuously cast into a round rod with a diameter ranging from 22 mm to 32 mm. The rod had a purity of 99.90% minimum copper. During casting, the rod was alloyed with silver up to 0.10%. The continuous cast rod was then put through an extrolling process which reduced the size of the rod to a diameter ranging from 19 mm to 28 mm. Typical characteristics and properties of the extrolled rod include:

A tolerance of +/−1% of the specified diameter;

A hardness of 50 maximum of the Rockwell F scale;

A grain size of 0.040 mm maximum;

A tensile strength of 31,000 psi to 35,000 psi;

A minimum elongation of 40%;

A minimum electrical conductivity of 100% IACS @ 20° C.; and

A clean, bright, smooth surface.

The extrolled rod was then cold drawn through a series of round dies, except that the final die had the shape (round or grooved) of the required trolley wire product. The wire was drawn through dies either individually or though a series of successive dies. The area of the wire is reduced 15% to 30% through each die, reducing the size of the wire and thereby increasing the tensile strength. A minimum of 65% cold work is performed following the extrolling operation to achieve the improved tensile strength.

Figure 4:
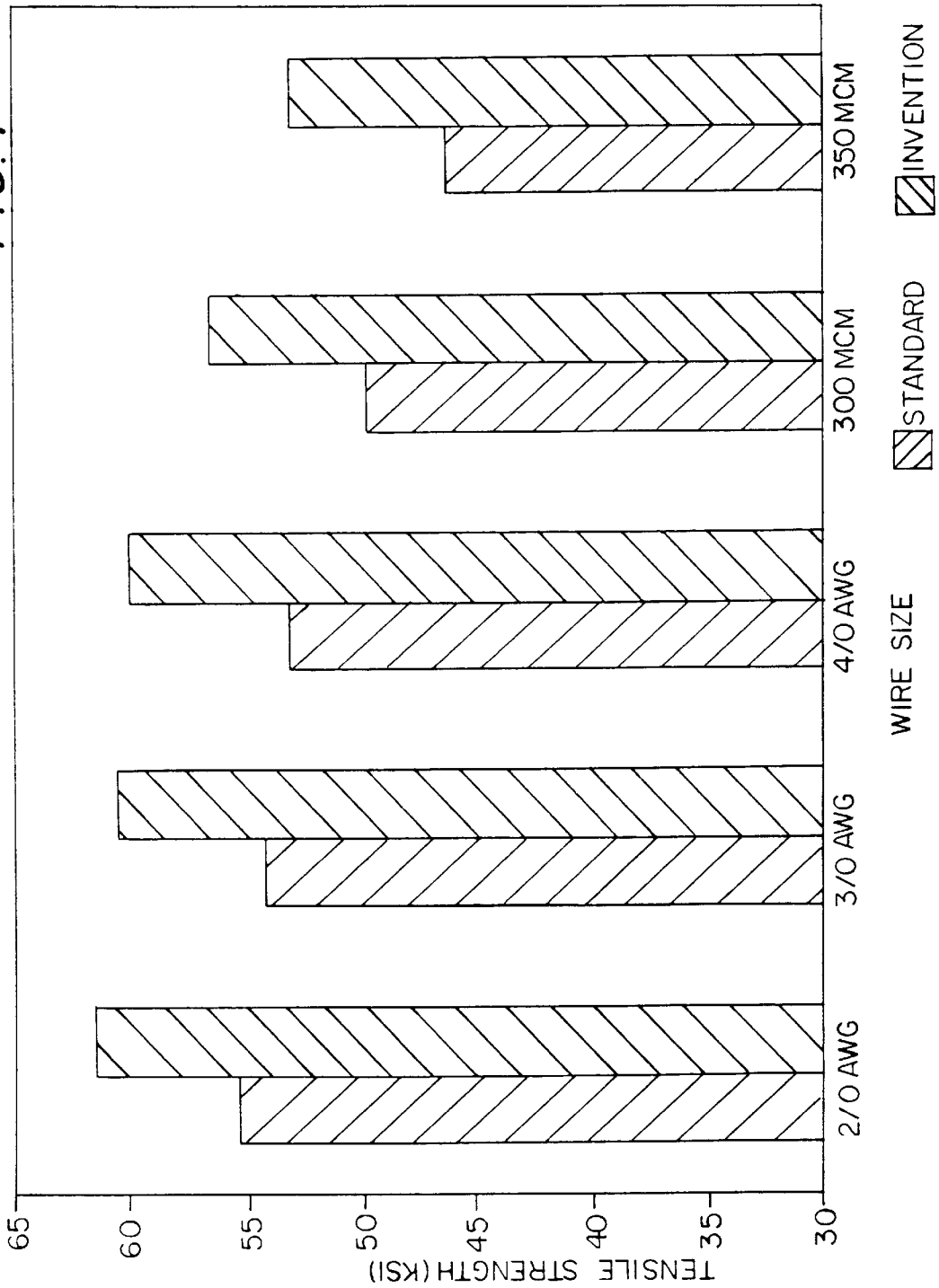
FIG. 4 is a bar graph showing the increased tensile strength of various sizes of the new copper trolley wire as compared to copper trolley wire made by standard commercial methods.

These copper trolley wires were then tested for their tensile strength and compared to the tensile strength of copper trolley wires made by standard commercial methods. The results of this comparison are shown in FIG. 4. The bottom of FIG. 4 shows the wire sizes in cmils and American Wire Gauge (AWG). FIG. 4 demonstrates that for each wire size the tensile strength increased at least 10% using the new process.

A comparison of the tensile strength of the copper trolley wire of this invention to the minimum tensile strength requirements of ASTM B47-95A also reveals the much improved tensile strength of the new copper trolley wire.

| Wire Size Area (cmils) | Minimum Tensile Strength from ASTM B47-95a for Silver Bearing Copper (psi) | Minimum Tensile Strength of Inventive Wire (psi) |
|---|---|---|
| 350,000 | 44,600 | 51,000 |
| 300,000 | 48,000 | 54,000 |
| 211,600 (4/0 AWG) | 51,300 | 57,000 |
| 167,800 (3/0 AWG) | 52,700 | 58,000 |
| 133,100 (2/0 AWG) | 53,000 | 59,600 |

In addition to improved tensile strength of the copper trolley wire of this invention, other properties of the copper trolley wire are improved in comparison to standard industry copper trolley wire. For example, a copper trolley wire of this invention having a size of 300,000 cmils was found to have the following properties:

| Property | Results |
|---|---|
| Tensile Strength | 56,000 psi |
| Yield Strength | 53,000 psi |
| Elongation | 7.0% |
| Hardness | 60 Rockwell B |
| Electrical Conductivity | 99.0% IACS @ 20° C. |
| Grain Size | 0.025 mm |

Thus, as those of skill in this art will recognize, the improvement in properties for the copper trolley wire of this invention is dramatic.

What is claimed is:

1. A copper trolley wire consisting essentially of at least 99.90% by weight copper and at most 0.10% by weight of a metal selected from the group consisting of silver, cadmium, tellurium, titanium, magnesium, manganese, chromium, zirconium, tin and combinations thereof, and having:

a tensile strength of at least 10% greater than that required for silver bearing copper trolley wire listed in ASTM B47-95a; and electrical conductivity at least as great as that listed in ASTM B47-95a.

2. The copper trolley wire of claim 1 wherein the tensile strength that is at least 15% greater than that required for silver bearing copper trolley wire listed in ASTM B47-95a.

3. The copper trolley wire of claim 1 having a grain size that does not exceed an average diameter of about 0.040 mm.

4. The copper trolley wire of claim 3 wherein the grain size does not exceed an average diameter of about 0.035 mm.

5. The copper trolley wire of claim 1 wherein said metal is silver.

6. Copper trolley wire consisting essentially of at least 99.90% by weight copper and at most 0.10% by weight of a metal selected from the group consisting of silver, cadmium, tellurium, titanium, magnesium, manganese, chromium, zirconium, tin and combinations thereof, and having:

a tensile strength of at least 10% greater than that required for silver bearing copper trolley wire listed in ASTM B47-95a;

ductility at least as great as that listed in ASTM B47-95a; and electrical conductivity at least as great as that listed in ASTM B47-95a.

7. The copper trolley wire of claim 6 wherein said metal is silver.

8. Copper trolley wire consisting essentially of at least 99.90% by weight copper and at most 0.10% by weight of a metal selected from the group consisting of silver, cadmium, tellurium, titanium, magnesium, manganese, chromium, zirconium, tin and combinations thereof, and having.

a tensile strength of at least 10% greater than that required for silver bearing copper trolley wire listed in ASTM B47-95a; and electrical conductivity at least as great as that listed in ASTM B47-95a; said wire being made by a process comprising:

a) casting a copper rod consisting essentially of at least 99.90% by weight copper and at most 0.10% by weight of a metal selected from the group consisting of silver, cadmium, tellurium, titanium, magnesium, manganese, chromium, zirconium, tin and combinations thereof, b) conforming the copper rod, and c) cold working the copper rod into a coil of wire.

9. The copper trolley wire of claim 8 wherein said metal is silver.

* * * * *

UNITED STATES PATENT AND TRADEMARK OFFICE
CERTIFICATE OF CORRECTION

PATENT NO.   : 6,077,364  
DATED        : June 20, 2000  
INVENTOR(S)  : Thomas J. Chandler et al.

Page 1 of 1

It is certified that error appears in the above-identified patent and that said Letters Patent is hereby corrected as shown below:

In the References Cited, under FOREIGN PATENT DOCUMENTS,  
change "7021843" to --7-021843--;  
change "7086325" to --7-086325--;  
change "7090430" to --7-090430--;  
change "9700339" to --97/00339--;

Column 3:  
line 32, insert --is-- after "which";

Column 4:  
Line 17, change "of" to --that is --;  
Line 35, change "is shown" to --are shown--;  
Line 42, insert --to-- after "according";  
Line 45, change "wire" to --wires--; and Column 6:  
Line 38, claim 14, change "having." to --having:--.

Signed and Sealed this

Twelfth Day of June, 2001

*Attest:*

*Attesting Officer*

NICHOLAS P. GODICI  
*Acting Director of the United States Patent and Trademark Office*